United States Patent [19]

Rhoads et al.

[11] Patent Number: 5,189,071
[45] Date of Patent: Feb. 23, 1993

[54] POLYMERIC COMPOSITION COMPRISING TRANSIENT FOAM CONTROL AGENT

[75] Inventors: Timothy W. Rhoads, Dalton, Ga.; Kyung W. Suh, Granville, Ohio; Takao Kadota, Utsunomiya, Japan; William G. Stobby, Johnstown, Ohio

[73] Assignee: The Dow Chemical Company, Midland, Mich.

[21] Appl. No.: 923,758

[22] Filed: Aug. 3, 1992

Related U.S. Application Data

[63] Continuation of Ser. No. 866,087, Apr. 6, 1992.

[51] Int. Cl.$^5$ .............................. C08J 9/08; C08J 9/10; C08J 9/14
[52] U.S. Cl. ......................................... 521/79; 521/81; 521/88; 521/95; 521/97; 521/146; 521/139; 521/57; 264/53
[58] Field of Search ...................... 521/79, 57, 81, 88, 521/95, 97, 139, 146; 264/53

[56] References Cited

U.S. PATENT DOCUMENTS

| | | | |
|---|---|---|---|
| 2,532,242 | 11/1950 | Ott | 260/2.5 |
| 3,293,196 | 12/1966 | Nakamori | 260/2.5 |
| 4,042,541 | 8/1977 | Watts | 260/2.5 B |
| 4,486,550 | 12/1984 | Rhoads | 521/79 |
| 4,520,136 | 5/1985 | Schwarz | 521/60 |

FOREIGN PATENT DOCUMENTS

| | | |
|---|---|---|
| 858930 | 1/1979 | Belgium . |
| 0343473A2 | 11/1989 | European Pat. Off. . |
| 773125 | 4/1957 | United Kingdom . |
| 974715 | 11/1964 | United Kingdom . |
| 2043648A | 10/1980 | United Kingdom . |

Primary Examiner—Morton Foelak

[57] ABSTRACT

A foamable composition comprising an alkenyl aromatic polymer, blowing agent and a transient foam control agent that is effective to reduce polymer melt viscosity in the melt phase but nonmiscible and nondetrimental to the solid polymer.

8 Claims, No Drawings

POLYMERIC COMPOSITION COMPRISING TRANSIENT FOAM CONTROL AGENT

CROSS-REFERENCE TO RELATED APPLICATION

This is a continuation of application Ser. No. 07/866,087 filed Apr. 6, 1992.

BACKGROUND OF THE INVENTION

This invention relates to an expandable polymeric composition of matter and method of preparation, and more particularly to an expandable alkenyl aromatic polymer composition with a volatile blowing agent and a transient foam control agent.

Alkenyl aromatic polymer foams such as polystyrene foams have found a wide variety of usages including insulation, cushion packaging, and the formation of molded articles such as cups, trays, and the like. When utilized as an extruded board insulating material, a fugitive blowing agent is normally incorporated into the heat plastified polymer and the resulting mixture extruded to a zone of lower pressure and allowed to expand. Existing blowing agents preferentially include the chlorofluorocarbons (CFC's) due to their ease of use and the resulting exceptional foam properties. However, questions regarding the long term effect of CFC's in the environment have caused manufacturers to seek ways to reduce the quantity of CFC's required to produce a given density of foam (generally lower density foams utilize larger quantities of CFC's) or to utilize other, less effective blowing agents, which are not suspected of environmental damage. In order to accomplish these desirable ends it is necessary to provide a molten polymer mixture having improved (reduced) viscosity and other properties in order that reduced amounts of CFC's or other less effective blowing agents may be employed.

In the past, attempts have been made to utilize plasticizers and/or plasticizing blowing agents in polystyrene foams to aid in melt foaming, particularly where very low densities are desired. Such plasticizers have been found to have an adverse effect on the final foam properties, and in some instances have resulted in a permanent softening of the foam.

Crosslinking of the foam during foaming to stabilize cell formation has also been attempted. However, the use of crosslinking agents must be carefully controlled as insufficient crosslinking does not produce the desired stabilization and over crosslinking makes processing difficult. Moreover, crosslinking of such foams makes reprocessing of the foam scraps difficult.

Accordingly, the need still exists in the art for a means to prepare extruded alkenyl aromatic polymer foams to enable reduction or elimination of CFC blowing agents.

SUMMARY OF THE INVENTION

According to the present invention there is provided a foamable polymeric composition comprising at least 50 percent by weight of an alkenyl aromatic polymer together with a blowing agent and from about 0.05 percent to about 15.0 percent by weight of a transient foam control agent. The transient foam control agent is compatible with the alkenyl aromatic polymer in the melt phase and acts to reduce the viscosity of the polymer melt during foaming, but is nonmiscible with the solid polymer and substantially nondetrimental to the physical properties thereof.

The effect of the transient foam control agent is to modify the melt rheology of the foamable polymeric composition, especially the primary alkenyl aromatic polymer constituent of the composition but not to interfere with desirable physical properties, particularly solid phase properties, of the polymeric composition. To accomplish this purpose it is necessary that the transient foam control agent be a solid that is nonmiscible with the alkenyl aromatic polymer at temperatures less than the glass transition temperature (Tg) of the polymer and subject to thorough dispersion into domains of sufficiently small size that no adverse effect on the physical properties of the polymer results. The composition in the solid phase may be more particularly described as a microdispersion of the transient foam control agent in the alkenyl aromatic polymer. The mixture is generally homogeneous and the transient foam control agent forms discrete non-interconnecting domains of particle size 0.1 to about 50 micrometers, thereby not detracting in appreciable degree from the polymer's physical properties in the solid phase.

At a temperature above the minimum foaming temperature of the alkenyl aromatic polymer, the transient foam control agent becomes compatible with the alkenyl aromatic polymer and preferably is also melted and effective to reduce the melt viscosity of the composition.

A very low density foam may be produced in accordance with the present invention by melt processing under pressure a polymeric composition comprising at least 50 percent by weight of an alkenyl aromatic polymer with a volatile blowing agent and the transient foam control agent to form a flowable mixture. The mixture is then extruded through a die to a zone of lower pressure where the blowing agent is activated to expand the composition to a cellular structure. This cellular foam may be thereafter exposed to atmospheric steam or hot air at a temperature of between about 80° to about 115° C. to cause further expansion of the foam to even lower densities. The exposure of the mixture to lower pressure and to steam or hot air preferably occurs sequentially after a period of aging the foam following its initial expansion. However, the process can take place substantially simultaneously in an on-line procedure whereby the extruded foam is immediately exposed to steam or hot air.

DETAILED DESCRIPTION OF THE PREFERRED EMBODIMENTS

Additional components of the expandable polymer composition may include polymers such as polyarylethers (especially polyphenylene oxide), polycarbonates, elastomers (especially polybutadiene, EPDM or styrene/butadiene block copolymer rubbers), polyethylene, etc. The expandable polymer composition of the present invention preferably includes at least 70 percent by weight of an alkenyl aromatic polymer resin. Preferably, this resin has a weight average molecular weight of between about 100,000 to about 300,000. Such molecular weight may be determined by gel permeation chromatography (GPC), for example.

By the term "alkenyl aromatic polymer" resin, is meant a solid polymer of one or more polymerizable alkenyl aromatic compounds and, optionally, at least one copolymerizable monomer. The polymer or copolymer comprises, in polymerized form, at least 70 percent by weight of polymer units derived from at least one alkenyl aromatic monomer having the general formula:

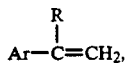

where Ar represents an aromatic hydrocarbon radical, or an aromatic halohydrocarbon radical of the benzene series, and R is hydrogen, a methyl group, or an ethyl group. Examples of such alkenyl aromatic polymers are the solid homopolymers of styrene, α-methylstyrene, o-methylstyrene, m-methylstyrene, p-methylstyrene, ar-ethylstyrene, ar-vinylxylene, ar-chlorostyrene, ar-bromostyrene, vinyl toluene, or the solid copolymers of one or more of such alkenyl aromatic compounds with other copolymerizable monomers such as acrylonitrile, anhydrides of maleic or itaconic acids, acrylic or methacrylic acid, or rubber-reinforced (either synthetic or natural) styrene polymers, and the like.

Blowing agents useful in the practice of the present invention are well known and may comprise solids or liquids which produce (decompose or volatilize) into gaseous products at extrusion temperatures. A preferred class of blowing agents includes halogenated hydrocarbon compounds having from 1 to 8 carbon atoms especially chlorofluorocarbons, hydrocarbon compounds having from 1 to 8 carbon atoms, low molecular weight alcohols, nitrogen carbon dioxide, water and mixtures thereof. When such compounds are used as the blowing agent, there can be from about 10 to about 200 gram, and preferably 50 to 150 gram of such blowing agent per kilogram of polymer composition. Especially preferred blowing agents include 1-chloro-1,1-difluoroethane (CFC-142b), 1-chloro-1,2,2,2-tetrafluoroethane (HCFC-124), 1,1,1,2-tetrafluoroethane (HCFC-134a), dichlorodifluoromethane (CFC-12), trichloromonofluoromethane (CFC-11), n-butane, isobutane, n-pentane, isopentane, water, carbon dioxide, ethyl chloride, nitrogen, and mixtures thereof. A highly preferred blowing agent comprises a mixture of $CO_2$ and CFC-142b in weight ratios from 5/95 to 50/50. Generally such blowing agents as CFC-142b or mixtures with carbon dioxide are less effective in producing suitable foam properties and their use is not as practiced as the "hard" chlorofluorocarbons such as CFC-12. Thus a workable system to prepare suitable foams with CFC-142b blowing agent is greatly desired.

The transient foam control agent used in the practice of the present invention, preferably comprises from about 0.1 to about 10 percent by weight of the composition, more preferably from about 0.3 percent to about 5.0 percent by weight.

Suitable transient foam control agents are preferably selected from $C_{2-30}$ aliphatic and aromatic carboxylic acids or polycarboxylic acid compounds and ester derivatives thereof, $C_{2-30}$ aliphatic and aromatic carboxylic acid amides. $C_{2-30}$ aromatic or aliphatic sulfones and amide derivatives thereof, $C_{5-30}$ aliphatic and aromatic polyhydroxy compounds. $C_{2-30}$ aliphatic and aromatic carbamates and carbamate esters, inertly substituted derivatives of the foregoing, and mixtures thereof.

Specific examples of the foregoing list of transient foam control agents are succinic acid, glutaric acid, adipic acid, pimelic acid, suberic acid, azelaic acid, sebacic acid, methyl urea, benzene sulfonamide, cyanoacetamide, N,N',hexamethylene bisacetamide, m-nitrobenzamide, mannitol, piperazine bis-alkylcarbamate, piperazine bis-hydroxyethyl-carbamate, etc.

In a particular preferred embodiment of the present invention the transient foam control agent is selected from $C_{4-10}$ aliphatic dicarboxylic acids and mixtures thereof. In particular, mixtures of the foregoing $C_{4-10}$ aliphatic dicarboxylic acids having a melting point from 110° to 130° C. are highly preferred transient foam control agents. For example mixtures comprising succinic, glutaric, adipic, pimelic, suberic, azelaic and/or sebacic acids in molar percentages of at least about 5 percent are especially desired. Highly preferred transient foam control agents comprise mixtures of adipic acid and sebacic acids, especially in weight ratios from 10/90 to 50/50. In a most preferred embodiment employing a mixture of the foregoing transient foam control agents, a eutectic mixture is employed, i.e. about a 30/70 weight ratio for the use of a mixture of adipic/sebacic acids.

The transient foam control agent may be readily blended with the alkenyl aromatic polymer resin in the solid form. Preferably, the transient foam control agent is fed directly into the extruder and melt processed with the alkenyl aromatic polymer resin, blowing agent, and other additives without the need for any additional mixing apparatus.

As is conventional, finely divided solid materials such as talc, calcium silicate, barium or zinc stearate, magnesium oxide, and the like can advantageously be incorporated with the polymer gel prior to expansion. Such finely divided materials aid in controlling the size of the cells and may be employed in amounts up to five percent by weight of the polymer. Fillers, pigments, lubricants, wetting agents, antioxidants, ignition resistant additives, and the like well known in the art can also be incorporated as desired.

In order that the invention may be readily more understood, reference is made to the following examples, which are intended to illustrate the invention, but are not to be taken as limiting the scope thereof. Unless stated to the contrary parts and percentages are based on weight.

EXAMPLE 1

The apparatus used in this example is a 1¼" screw type extruder having two additional zones for mixing and cooling at the end of usual sequential zones for feeding, melting, and metering. An opening for blowing agent injection is provided on the extruder barrel between the metering and mixing zones. At the end of the cooling zone, there is attached a die orifice having an opening of rectangular shape. The height of the opening, called die gap hereinafter, is adjustable while its width is fixed at 6.35 mm.

A granular polystyrene having a weight average molecular weight of about 200,000 was dry blended with a predetermined amount of a transient foam control agent. A small amount, 0.05 pph each of magnesium oxide and calcium stearate, about 0.2 pph talc, 0.03 pph pigment and 2.0 pph brominated fire retardant were mixed with the polymer granules. The mixture was fed into the extruder at an essentially uniform rate of about 4.54 kg (10 pounds) per hour. Various blowing agents were injected into the extruder in amounts identified in Table I. The extruder zones were maintained at 182°, 193°, and 204° C. for the feeding, melting and metering, and mixing zones, respectively. The temperature of the cooling zone was adjusted so that the gel cooled to a uniform temperature of about 125° C. In Runs 1-4 blowing agents comprising $CO_2$ and CFC-142b (a "soft", environmentally acceptable, chlorofluorocarbon) were used. Foam production conditions are contained in Table I. Physical property values of the resulting foams are contained in Table II.

TABLE I

| Run | Blowing Agent | | | tfca[2] (wt/wt) | Die Pressure (psi) |
|---|---|---|---|---|---|
| | Type[1] | Parts per hundred | Mole/kg Polymer | | |
| A* | Et/$CO_2$F12 | 4.5/1.5/7.0 | 1.62 | — | 792 |
| B* | $CO_2$/F142b | 1.5/12.8 | 1.62 | — | 792 |
| 1 | $CO_2$/F142b | " | 1.62 | 30/70 | 793 |
| 2 | $CO_2$/F142b | " | 1.62 | 10/90 | 761 |
| 3 | $CO_2$/F142b | " | 1.62 | 20/80 | 715 |
| 4 | $CO_2$/F142b | 1.5/10.9 | 1.48 | 30/70 | 819 |

*Not an example of the invention
[1]Et = ethyl chloride, F12 = CFC-12 (dichlorodifluoromethane), F142b = CFC-142b
[2]Transient foam control agent comprising a mixture of adipic acid and sebacic acid in the indicated weight ratio, 1.5% total.

TABLE II

| Run | Density (kg/M$^3$) | Cell Size[1] | Open Cell (%) | Water absorption (%)[2] | R-Value[3] | Compressive Strength (psi)[4] | | |
|---|---|---|---|---|---|---|---|---|
| | | | | | | Vertical | Extrusion Direction | Horizontal |
| A* | 31.6 | 0.25 | 0 | 0.02 | 5.05 | 37.7 | 27.2 | 31.8 |
| B* | 31.2 | 0.29 | 0 | 0.00 | 4.92 | 44.7 | 30.1 | 30.1 |
| 1 | 28.2 | 0.33 | 0 | 0.05 | 5.04 | 36.4 | 22.1 | 28.7 |
| 2 | 33.6 | 0.30 | 0 | 0.03 | 5.01 | 46.4 | 29.0 | 28.9 |
| 3 | 32.6 | 0.33 | 0 | 0.04 | 5.03 | 41.2 | 29.5 | 27.5 |
| 4 | 34.7 | 0.34 | 0 | 0.02 | 5.17 | 36.3 | 38.4 | 28.2 |

[1]Measured according to FP-147, vertical direction, (mm).
[2]Measured according to ASTM C272-80
[3]Normalized aged R-Value
[4]Measured according to ASTM D1621-79

The results of Table II indicate that suitable polymer foams may be prepared according to the present invention utilizing blowing agents comprising "soft" CFC's such as CFC-142b and mixtures thereof with $CO_2$ when the transient foam control agents of the invention are also used. The foamed composition of Run 1 achieved reduced density without loss of other physical properties. The composition employed in Run 4 employed a reduced quantity of blowing agent (1.48 mol/kg polymer instead of 1.62, an 8.6% reduction) and still maintained acceptable physical properties for the resulting cured foam product.

What is claimed is:

1. A process for preparing a polymeric foam, comprising: (a) blending and melting at least 50 percent by weight of an alkenyl aromatic polymer based upon the weight of the polymeric foam, a blowing agent, and from about 0.05 to about 15 weight percent of a transient foam control agent to form a flowable mixture; and (b) conveying the flowable mixture through a die to a zone of lower pressure to form the foam;

the transient foam control agent being compatible with the alkenyl aromatic polymer in the melt phase, acting to reduce the melt viscosity of the polymer melt, and being nonmiscible with the solid polymer and substantially nondetrimental to the physical properties thereof; the transient foam control agent being selected from the group consisting of $C_{2-30}$ aliphatic and aromatic carboxylic and polycarboxylic acids and ester and amide derivatives thereof; $C_{2-30}$ aromatic and aliphatic sulfones and amide derivatives thereof, $C_{5-30}$ aliphatic and aromatic polyhydroxy compounds; $C_{2-30}$ aliphatic and aromatic carbamates and carbamate esters, inertly-substituted derivatives of the foregoing; and mixtures of the foregoing transient foam control agents.

2. The process according to claim 1, wherein the alkenyl aromatic polymer is styrene, 3. The process according to claim 1, wherein the blowing agent comprises 1-chloro-1,1-difluoroethane.

4. The process according to claim 1, wherein the blowing agent comprises $CO_2$ and 1-chloro-1,1-difluoroethane in weight ratios from 5/95 to 50/50.

5. The process according to claim 1, wherein the transient foam control agent comprises a mixture of $C_{4-10}$ aliphatic dicarboxylic acids.

6. The process according to claim 5, wherein the transient foam control agent comprises a mixture of adipic acid and sebacic acid.

7. The process according to claim 6, wherein the transient foam control agent comprises 10-50% weight percent adipic acid and 50-90 weight percent sebacic acid.

8. The process according to claim 5, wherein the transient foam control agent comprises about a eutectic mixture of the aliphatic dicarboxy acids.

* * * * *

UNITED STATES PATENT AND TRADEMARK OFFICE
CERTIFICATE OF CORRECTION

PATENT NO. : 5,189,071

DATED : February 23, 1993

INVENTOR(S) : Timothy W. Rhoads, et al.

It is certified that error appears in the above-identified patent and that said Letters Patent is hereby corrected as shown below:

Column 6, line 47:
    In Claim 7, delete "%".

Signed and Sealed this

Fourth Day of January, 1994

Attest:

BRUCE LEHMAN

Attesting Officer    Commissioner of Patents and Trademarks